US006609978B1

(12) United States Patent
Paulsen

(10) Patent No.: US 6,609,978 B1
(45) Date of Patent: Aug. 26, 2003

(54) ELECTRONIC PRIZE FULFILLMENT FOR A GAMING SYSTEM

(75) Inventor: Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/479,754

(22) Filed: Jan. 7, 2000

(51) Int. Cl.[7] .......................... G06F 17/00; G06F 19/00
(52) U.S. Cl. .......................................... 463/42; 463/25
(58) Field of Search ............................ 463/20, 25, 40, 463/41, 42

(56) References Cited

U.S. PATENT DOCUMENTS 2,043,166 A 6/1936 Hart et al. .................. 273/138
3,796,433 A 3/1974 Fraley et al. ............... 273/138
4,191,376 A 3/1980 Goldman et al. ........... 273/139
4,240,635 A 12/1980 Brown ................... 273/138 A
4,398,708 A 8/1983 Goldman et al. ............. 270/18
5,816,918 A * 10/1998 Kelly et al. ................... 463/16
5,833,537 A 11/1998 Barrie
6,015,344 A * 1/2000 Kelly et al. ................... 463/16
6,039,648 A * 3/2000 Guinn et al. .................. 463/16
6,110,041 A * 8/2000 Walker et al. ................ 463/20
6,113,495 A * 9/2000 Walker et al. ................ 463/42
6,251,017 B1 * 6/2001 Leason et al. ................ 463/42

* cited by examiner

*Primary Examiner*—Michael O'Neill
*Assistant Examiner*—Julie Brocketti
(74) *Attorney, Agent, or Firm*—Seyfarth Shaw; George H. Gerstman

(57) ABSTRACT

A gaming system and method facilitating electronic fulfillment of prizes is provided. A electronic message is sent from a gaming terminal or casino, in response to winning at least certain prizes, such as non-monetary prizes, to a fulfillment entity. Fulfillment entities which are not a part of or controlled by the casino may be retail entities such as Internet retail entities. In one embodiment, the fulfillment entity selects or formulates a web page displaying a prize or a selection of prizes for display to a user at the gaming terminal. When several prizes or prize options are displayed, the user may select a desired non-monetary prize, e.g. using a touch screen keypad and the like. The prize fulfillment entity delivers the prize preferably at a location selected or preferred by the user, e.g. using mail, parcel delivery and the like.

36 Claims, 5 Drawing Sheets

ELECTRONIC PRIZE FULFILLMENT FOR A GAMING SYSTEM

Cross reference is made to application Ser. No. 08/723,322, now U.S. Pat. No. 5,833,537, incorporated herein by reference.

The present invention relates to a system for providing prize fulfillment and in particular to providing prize fulfillment using an electronic fulfillment system for casino also or other gaming systems or processes.

BACKGROUND INFORMATION

Gaming systems typically involve providing certain services that may have associated costs, among which is prize fulfillment when players have won prizes. Prize fulfillment can be particularly problematic when non-monetary (or other substantially non-fungible) prizes are provided such as prizes which include merchandise or services. When such non-monetary prizes are provided, typically being provided directly by the casino or other gaming operator, the process of prize fulfillment can include a number of costs such as the cost of providing an accounting or recordkeeping system between the time the prize is won and the time the merchandise or service is delivered, the cost of warehousing (or otherwise making available) non-monetary prizes, the cost of actually delivering the merchandise or service, the cost of dealing with any defects in the merchandise, or delivery of the wrong merchandise and the like. Often, the casino or other game operator is not primarily configured for delivering the types of merchandise or service that may be provided as prizes, and these costs may be more burdensome for the casino or other game operator than they might be for other entities which are more focused on such items as a major portion of their business. Nevertheless, provision of non-monetary prizes may be desirable for gaming operators, e.g., in situations where at least some potential players may prefer non-monetary prizes (and thus may be more attracted to those casinos or other game operators which can offer such prizes) and/or because certain jurisdictions may restrict some or all prizes to non-monetary prizes. Accordingly, it would be useful to provide a system which facilitates non-monetary prizes, e.g. by reducing some or all of the cost or burdens associated with non-monetary prizes in previous systems. It would be useful to provide a system which facilitates shifting some or all of the costs associated with non-monetary prizes to an entity other than the game operator, such that the steps or services provided for non-monetary prize fulfillment can be performed by entities which are more configured for providing such steps or services as an ordinary part of their business.

Although non-monetary prizes may be preferred by at least some players, it is believed that players, in general, wish to have a wide, and preferably changing, variety of non-monetary prizes available and that if the players perceive that they are offered substantially the same non-monetary prizes over an extended time period, there will be a lessened potential for the players to return to a casino or other gaming system or to continue playing at a casino or other gaming system for an extended period. However, previous casinos or other gaming operators have generally found it infeasible to maintain a large and/or time-varying inventory of merchandise or other non-monetary prizes of a type or magnitude to maintain player interest. Accordingly, it would be advantageous to provide a system for non-monetary prize fulfillment which can provide a desirable degree of prize variability while avoiding placing an inventory-maintenance or similar burden on casinos or other game operators.

SUMMARY OF THE INVENTION

The present invention includes a recognition of the existence, source and/or nature of problems in previous approaches and systems, including as described herein. In one aspect, non-monetary prizes are fulfilled by an electronic fulfillment system, with information about the nature of the merchandise (or other non-monetary prize) and the location to which it is to be delivered being provided electronically from the gaming system to a prize fulfillment system. Although it is possible to provide systems in which some or all of the prize fulfillment functions are performed, by the casino or other game operator (or an entity which is a part of, or associated with, the casino or other game operator) in response to electronic information, in one embodiment, the prize fulfillment system is an entity different from the casino, preferably an entity which is configured for providing goods or services in response to electronically-delivered requests or orders. In one embodiment, the prize fulfillment system is an Internet-based or Internet-enabled retail entity (e.g. an entity which ordinarily received non-gaming-based order for goods or services over the Internet) and the electronic information for providing prize fulfillment is delivered to the entity over the Internet. As used herein, the term Internet should be understood as including not only those communications using an Internet Protocol which are conveyed (typically long distances) over e.g. an Internet backbone, but, as well, other communications which use Internet protocols, Hypertext Transfer Protocols (HTTP) and the like, such as Internet-style communications that can be conveyed over local area networks (LANs) or similar local systems, including so-called Intranet communications and systems.

In one embodiment, the non-monetary prizes are delivered to a location specified or preferred by the player, such as a player's home or business address, a player's hotel room, a third party address specified by the player and the like. Delivery may be by any of a number of means such as by mail, parcel delivery services, couriers, casino employees, prize fulfillment entity employees and the like.

In one embodiment, accounting transactions between the casino and the prize fulfillment entity are settled electronically such as by the casino transmitting an authorization, to the casino's bank, for debiting the casino's account, and the prize fulfillment entity transmitting a demand or request for funds to the casino's bank.

In one aspect, a gaming system and method facilitating electronic fulfillment of prizes is provided. A electronic message is sent from a gaming terminal or casino, in response to winning at least certain prizes, such as non-monetary prizes, to a fulfillment entity. Fulfillment entities which are not a part of or controlled by the casino may be retail entities such as Internet retail entities. In one embodiment, the fulfillment entity selects or formulates a web page displaying a prize or a selection of prizes for display to a user at the gaming terminal. When several prizes or prize options are displayed, the user may select a desired non-monetary prize, e.g. using a touch screen keypad and the like. The prize fulfillment entity delivers the prize preferably at a location selected or preferred by the user, e.g. using mail, parcel delivery and the like.

DETAILED DESCRIPTION OF THE PREFERRED EMBODIMENT

Figure 1:
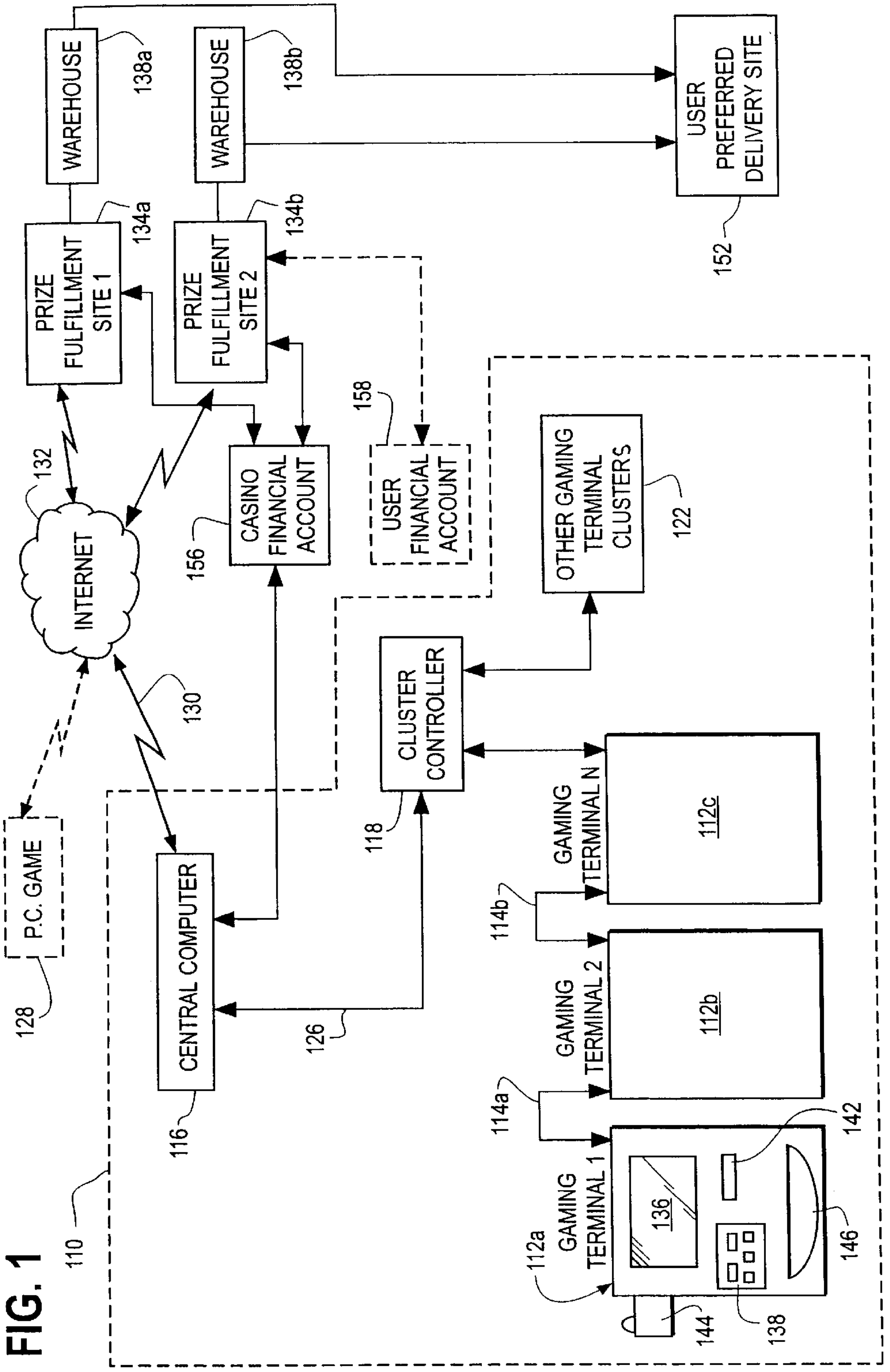
FIG. 1 is a block diagram depicting components of a prize fulfillment arrangement for use by a gaming system according to an embodiment of the present invention.

As depicted in FIG. 1, a gaming operator such as a casino may provide a plurality of gaming terminals 112*a,b,c* coupled (e.g. via a daisy chain coupling 114*a,b* or other coupling) typically via a cluster controller 118 or other intermediate computer to a central computer 116 (which may also be coupled to other terminal clusters 122), e.g. over a fiberoptic or cable network communication system 124, 126. Preferably, the gaming terminals 112*a,b,c*, in addition to providing output devices such as LCD screens 136 or other game displays or outputs, also includes various input devices such as providing the screen 136 as a touch screen, providing one or more keys or keyboards 138, providing a card reader such as a player card reader 142, providing a wager input such as a coin, ticket, token or bill acceptor 144 and/or providing, in some embodiments, one or more monetary prize output devices such as a coin output tray 146. Typically, gaming terminals 112 are controlled by a computer (or microprocessor-based circuitry) programmed to play at least a first game. The present invention can be used in connection with playing any of a variety of games including slot machine or simulated slot machine games, simulated card games, keno games, arcade games and the like. In some terminals any of two or more games may be played on a terminal, e.g. as selected by the player or as configured by the casino or other game operator. In some or all gaming terminals, the game may include various levels or types of prizes such as providing for main-game prizes as well as bonus prizes. The present invention can be used to provide prize fulfillment for main game prizes, for bonus prizes or for both types of prizes.

In the embodiment of FIG. 1, the central computer is provided with a connection 130 to the Internet 132 (including Intranet systems or other electronic communication system) for connection to one or more prize fulfillment sites 134*a* 134*b*.

Figure 2:
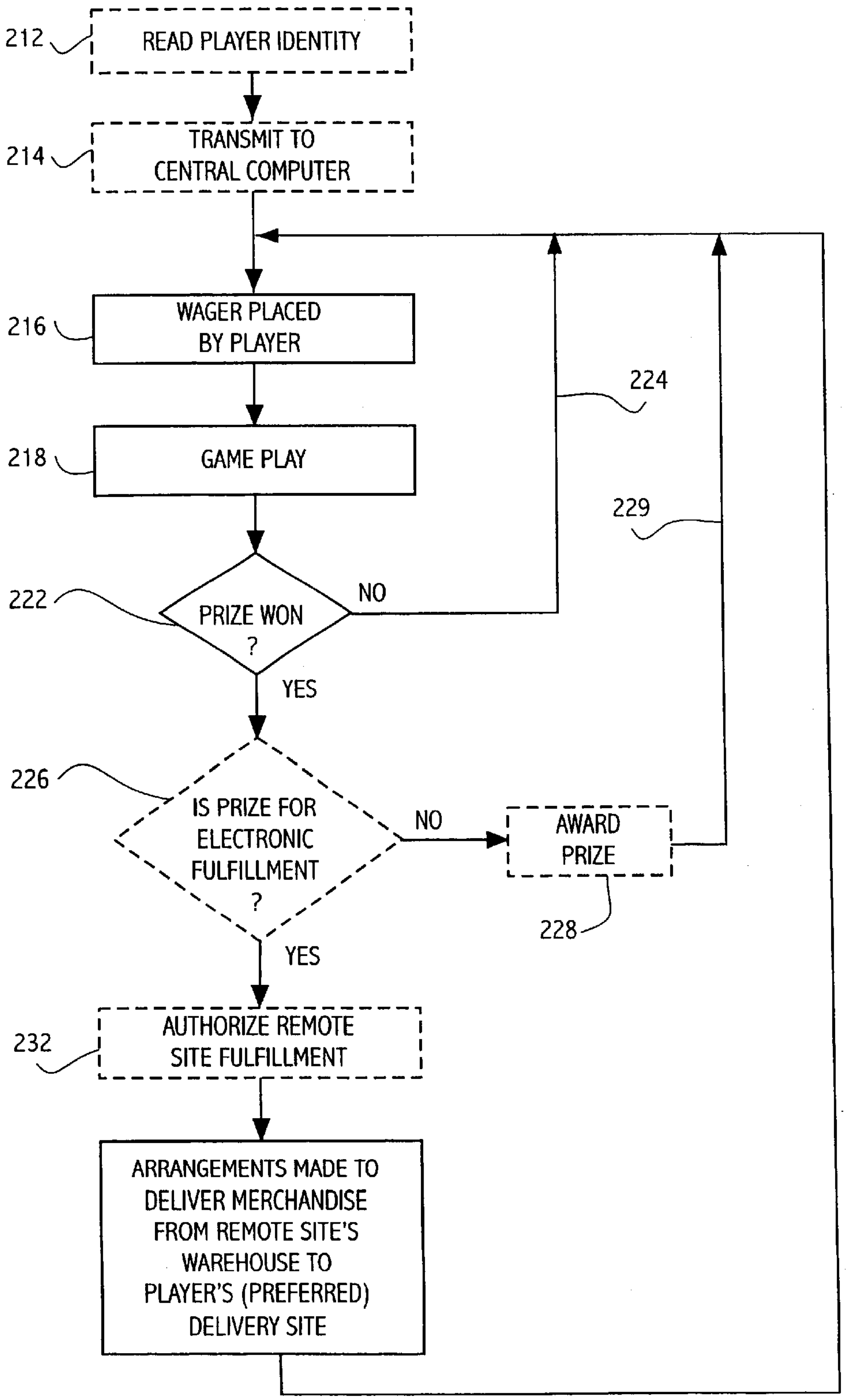
FIG. 2 is a flow chart depicting a prize fulfillment process according to one embodiment of the present invention.

As depicted in FIG. 2, in one embodiment, the gaming terminal reads or obtains player identity information 212. Typically, this may be obtained from a player-card reader 142, although it is also possible to provide for biometric identification, e.g. as described in U.S. patent application Ser. No. 60/153,745 (attorney file number 3735–929), incorporated herein by reference, or to prompt for input of player information, e.g. via the touch screen 136, keyboard 138 and the like. When player identity is obtained, in the embodiment of FIG. 2, the information is transmitted to the central computer 214, 116, e.g. for use as described below. Typically a player will place a wager 216 and will play a round of the game 218 (such as a spin of slot machine reels, dealing of a hand of simulated cards, and the like). A determination is made as to whether the outcome of the game is associated with the winning of a prize 222. Typically this determination is made by (or displayed on) the gaming terminal 112, although it is also possible to provide configurations in which the game outcome and/or prize determination is made by another entity such as the central computer 116. If a prize is not won 224 the process returns to permit additional wagering and play if desired.

In one embodiment, all prizes are configured for electronic fulfillment. However, in an embodiment in which there are at least some prizes which are not fulfilled by electronic fulfillment, it is next determined whether the prize that was won is a prize intended for electronic fulfillment 226 and, if not, (e.g., a monetary prize), for awarding the prize in the normal fashion 228 (i.e., other than by electronic fulfillment). In one embodiment the decision of whether the prize is for electronic fulfillment 226 is made on the basis of the type of prize which is won. For example, a slot machine game may be configured such that a “top jackpot” prize is always provided as a monetary output prize and is not provided by electronic fulfillment whereas (some or all) relatively lower-values prizes are predefined as being prizes for electronic fulfillment. For example, in the context of a slot machine, it may be predetermined that a top jackpot prize will be for non-electronic fulfillment such as monetary payout whereas a 3-cherry prize may be for electronic fulfillment (although, as will be clear to those of skill in the art after understanding the present disclosure, it is also possible to provide configurations of the present invention in which electronic fulfillment is used for the top prize or prizes, or may or all of the game’s prizes). In some embodiments, some or all of the prizes may be varied, form time to time, to be either monetary prizes for non-electronic fulfillment or prizes (such as merchandise, services and the like) to be fulfillment be electronic fulfillment. In this embodiment, the selection between electronic fulfillment and non-electronic fulfillment may be varied randomly, under the control of the casino or maybe in response to the selection or preference and put by the player (either before winning the prize or in response to a prompt displayed when the prize is won).

It is possible to provide configurations of the present invention in which some or all prizes are fulfilled by an electronic fulfillment process but in which the fulfillment process is performed or controlled substantially by the casino or other game operator. If the fulfillment process is not performed or controlled by the casino (or other game operator) then the central computer 16 will authorize a remote site such as a third party site to perform the prize fulfillment 232. In the embodiment of FIG. 1, this is achieved by sending a message from the central computer 130 to one or more prize fulfillment sites 134*a*, such as via the Internet 132. Electronic communication may be in one form of a Internet protocol message such as a web site request message, an Internet e-mail protocol message, or other types of electronic message formats such as local area network messages, wide area network messages and the like. In other embodiments, other, non-Internet communication systems can be used such as a telephone communication system, satellite communication system, local area network or wide area network communication systems and the like.

Regardless of whether the prize fulfillment site is part of or is controlled by the casino 110 (or other gaming operator), the information for prize fulfillment is delivered to the prize fulfillment site in an electronic fashion such as forming an electronic message including (preferably encoded or otherwise secure) indicators of the size or type of prize to be fulfilled and to whom or to where the prize is to be delivered. It is possible to include additional information in the electronic communication such as information regarding the identity or preferences of the player, previous prize or gaming history of the player and the like. The information regarding the size or type of prize and the person or place for delivery can be provided in a single message or in two or more different messages. Some or all of the information may all come directly from the central computer 116 or from another source such as from the gaming terminal.

In response to an electronic message that a prize has been won, the prize fulfillment site makes arrangements to deliver to merchandise, e.g. from a warehouse 138*ab* associated with or serving the prize fulfillment entity. For example, the prize fulfillment site may deliver an electronic message to the warehouse requesting or ordering the warehouse to deliver a particular item or items to a particular address.

The address to which the prize delivery is made may be specified or selected by the player (either at the time that the prize is won or at a previous time, with the information being stored for later use). It is also possible to base the delivery site on other information such as credit card address information, player card address information, hotel registration information and the like. The delivery to the user preferred delivery site 142, may be made by a number of procedures 152 including by mail, by a parcel delivery service, by a courier service and/or by employees of the warehouse 138, prize fulfillment site 134 and/or casino 110. In one embodiment, players may be offered a choice of delivery options such as service delivery, two day delivery, overnight delivery or the like, with an option to charge additional delivery cost to a credit card or other account 158.

In some embodiments, some or all non-monetary prizes may involve delivery of services rather than merchandise, such as winning admission or tickets to entertainment events, golf, bowling or other games, personal services such as spa services, airline or other travel services, hotel or other lodging services, restaurant services and the like. In the case of winning services, prize fulfillment may involve delivering, to the player, tickets, a coupon, voucher or other entitlement paper or token, and/or delivery of information regarding the prize won to the service provider.

Figure 3:
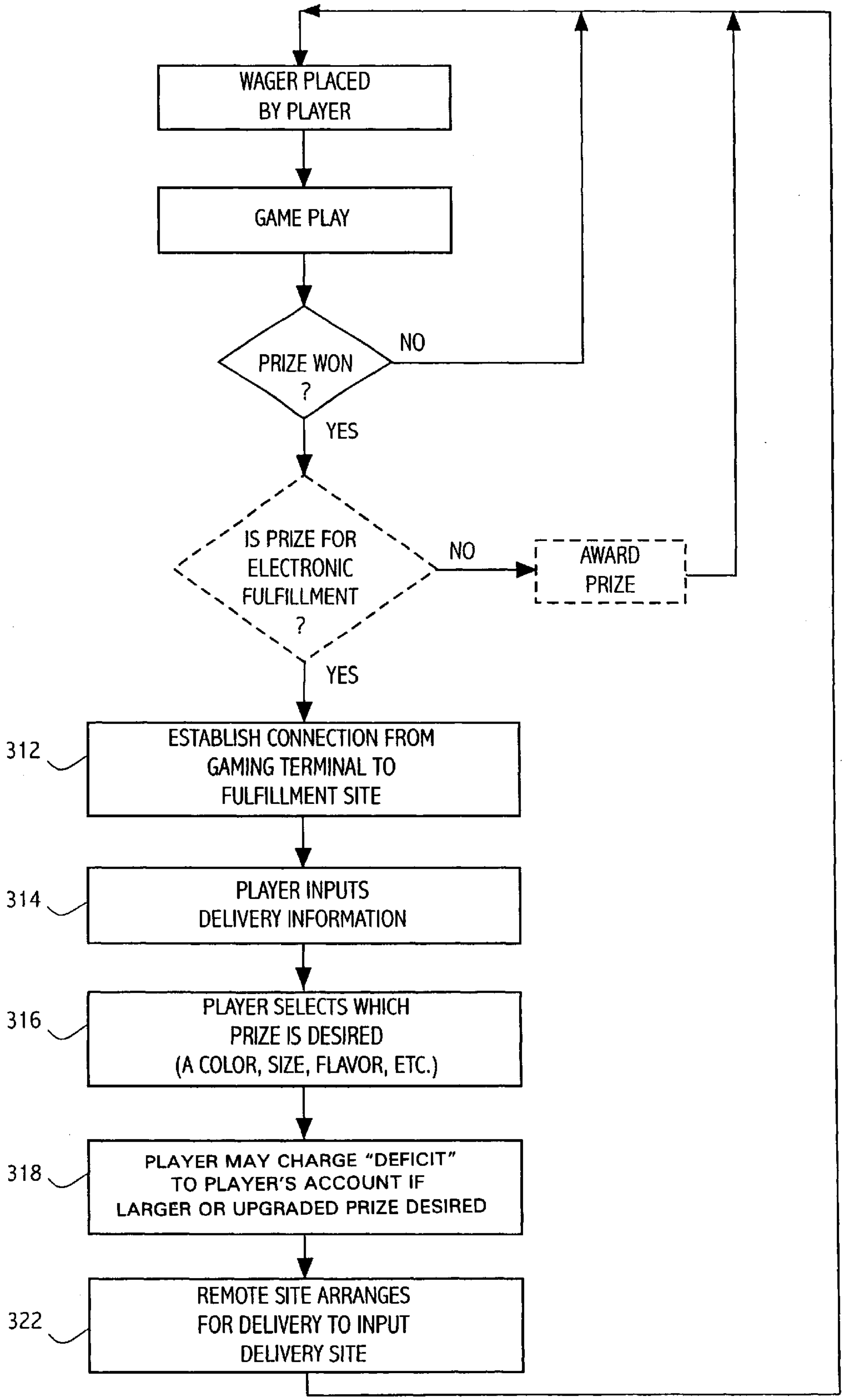
FIG. 3 is a flow chart depicting a prize fulfillment process according to an embodiment of the present invention.

In some situations, players may be reluctant or unwilling to provide identity, address or other personal information to the casino or other game operator and FIG. 3 depicts an embodiment which can be implemented without preproviding or storing address or similar information at the casino. In the embodiment of FIG. 3, in response to winning a prize which is for electronic fulfillment, a connection will be established from the gaming terminal to the fulfillment site 312. In general, communications may be directly from the gaming terminal, via the Internet to the fulfillment site 134 or may be established via the central computer and/or cluster controller 118 as depicted in FIG. 1. Once the communication is established, typically in response to a prompt, the player will provide delivery information such as inputting an address, hotel room number and the like, e.g. using input devices 136, 138. In this way delivery information can reach the prize fulfillment site without having been provided to and/or stored at the casino.

Although the present invention can be implemented in configurations in which the prizes which are won are determined without substantial user input or choice, in the embodiment of FIG. 3, a player is given an opportunity to select among a plurality of prizes 316 and/or to select features or options of a prize (such as color, size, flavor and the like). In one embodiment, the particular items from which the player may select, and/or the manner in which the selection is displayed to the user, is substantially controlled by the prize fulfillment site 134. Preferably, the display presented to the user is provided using Internet protocols such as by formulating and transmitting a one or more web pages from the fulfillment site 134, over the Internet 132 for display on a display device 136 of a gaming terminal 112. For example, the prize fulfillment site 134 may select or formulate a web page for displaying the plurality of prize options, e.g. for display, as a web page on the display device 136 of the gaming terminal. By way of illustration, if a player has won a t-shirt prize, the prize fulfillment site 134 may download the web page displaying a plurality of different t-shirts from which the player may select and may offer the player the option to choose among various t-shirt sizes, colors, styles and the like. The downloaded web page may, in some instances, include the name or other identification and/or advertising, e.g. of or for the company performing the fulfillment or other entity. In the embodiment depicted in FIG. 2, an indicator of player identity is obtained or read such as by obtaining from a player card reader 142, obtaining from user input (e.g. by keyboard 138 or touch screen 136) from biometric identification and the like. The player identification information is transmitted to the central computer 116, e.g. for use in connection with configuring or providing electronic prize fulfillment as described below.

In some situations players may be disinclined to provide address identity or other information to the casino.

Preferably, the users choices are limited to those downloaded and displayed by the fulfillment site and which generally correspond to the magnitude of the prize or value of the prize which has been won. However, it is also possible to configure embodiments of the invention in which the player may, in at least some instances, have an option to upgrade or otherwise change the prize which has been won. For example, if the player has won a t-shirt, player may be presented with an option to upgrade to a jacket or sweatshirt. In one embodiment, this is achieved by allowing the user to pay for the additional cost or value of the upgraded prize, e.g. by charging to a users credit card or other financial account 158. The remote fulfillment site arranges for delivery 322 to the site or address input previously 322.

Figures 4, 4A:
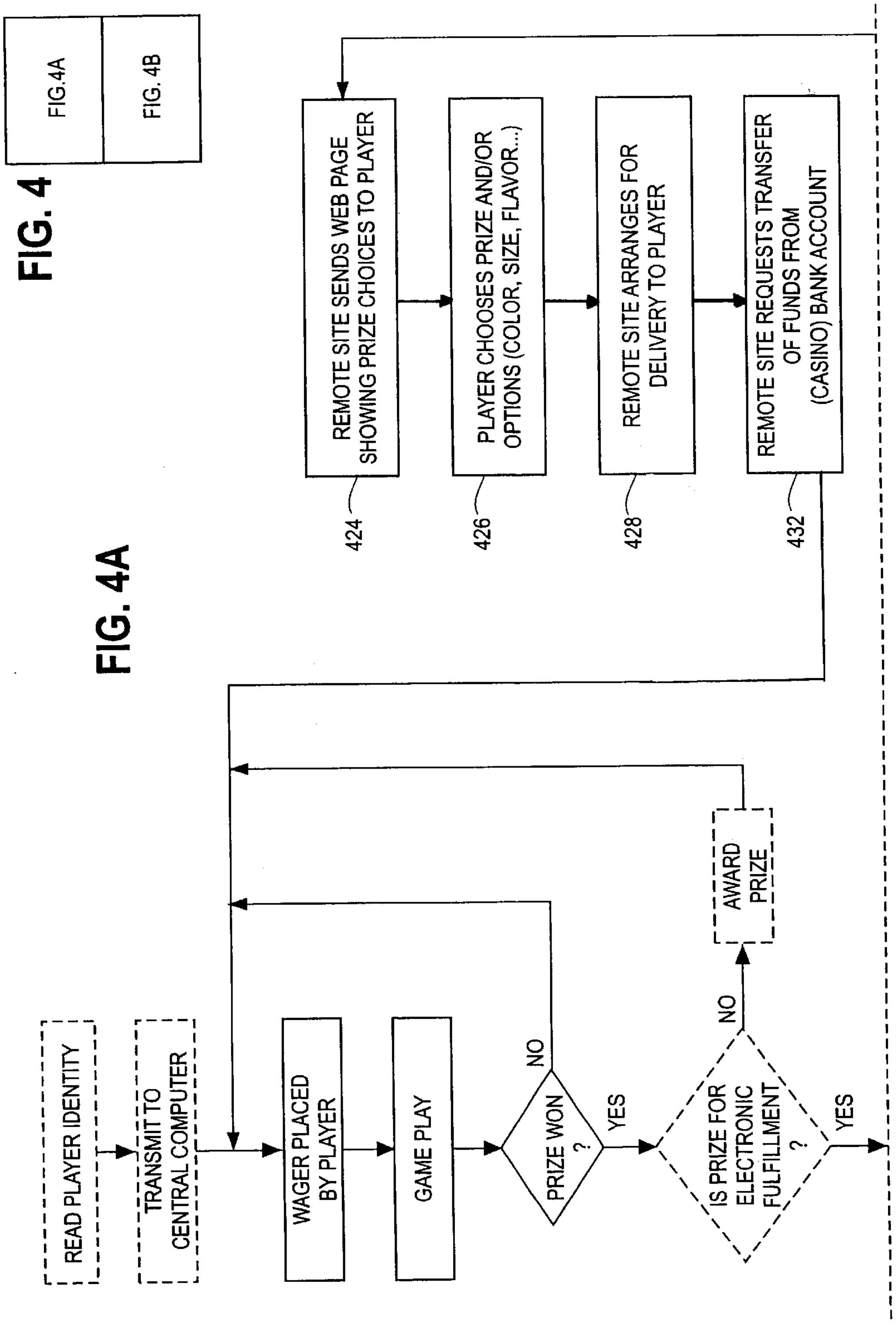
FIG. 4 is a flow chart depicting a prize fulfillment process according to an embodiment of the present invention.
Figure 4B:
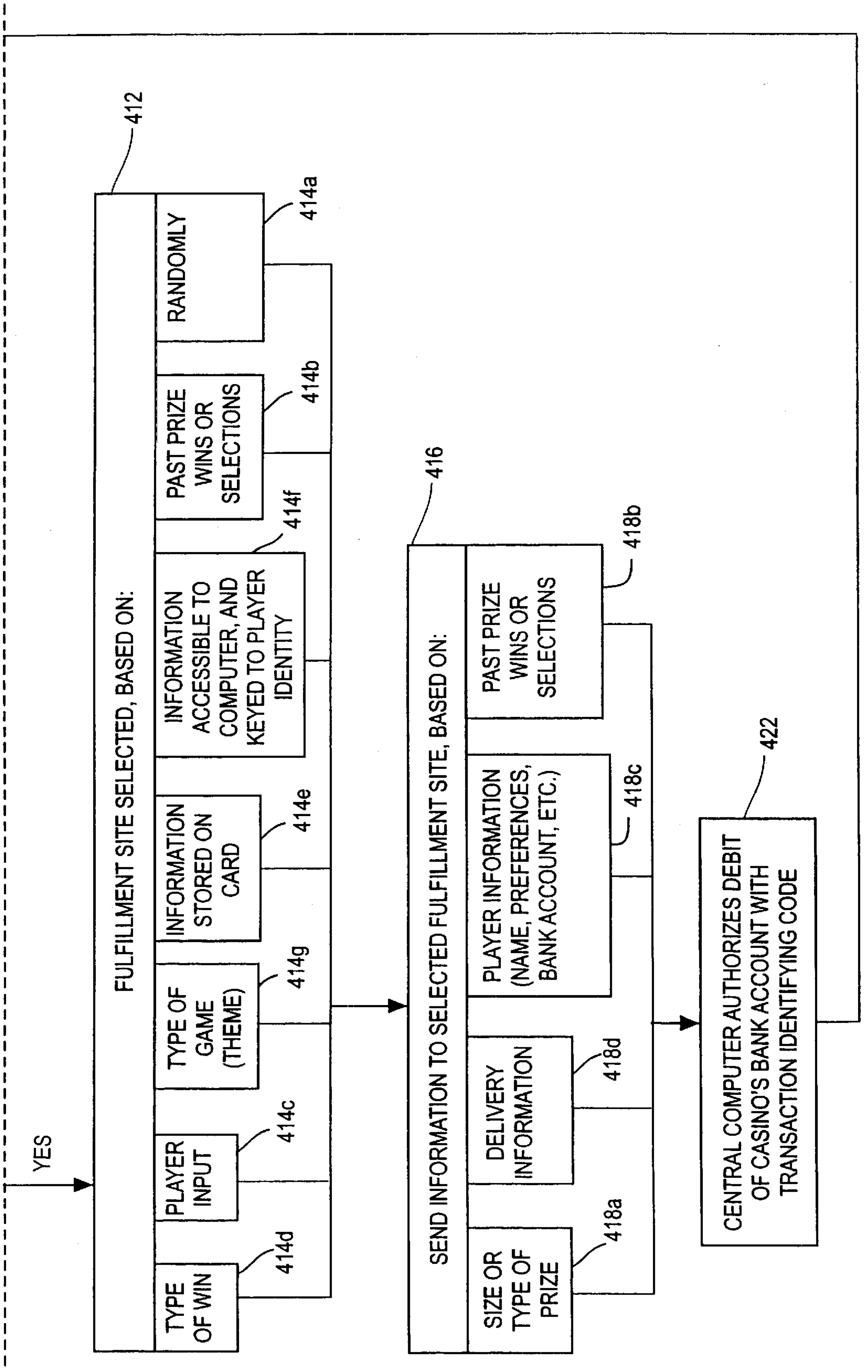

As noted above, it is preferred to provide a relatively wide variety of merchandise and/or services as prizes. Although it is possible to use a single fulfillment site or company to achieve a wide variety of prizes, in other situations it is desired to provide two or more different fulfillment companies or entities 134*a,b* to assist in achieving the desired variety. As depicted in FIG. 4, when two or more potential fulfillment sites are available, the fulfillment site may be selected based on a variety of items 412. In one embodiment, the selection is a random selection 414*a*. In another embodiment, the selection is based on previous selections or prizes won 414*b*, e.g. such that if a player has previously won a prize selected from a Internet book seller, the next prize may be fulfilled using an Internet apparel retailer and the like. In one embodiment, selection may be based on player, e.g. allowing a player to select among a plurality of displayed fulfillment entity choices, or based on player interest, characteristics and the like, e.g. which have been input by the player 414*c*. In one embodiment, selection of the fulfillment entity is based on the type of win. For example, the game may be constructed such that (in the context of a slot machine type game) a three-cherry win will result in fulfillment by an Internet movie ticket retailer and a win of a three-plum variety will result in fulfillment by an Internet concert ticket retailer. In one embodiment, selection of the fulfillment entity will be based on information about the user which was stored on the player card 414*e* (if any) and/or information about the player which has been stored on (or accessible to) the central computer 116, e.g. correlated with the player by means of player identification obtained from the player card 142 or other identification means 414*f*. In one embodiment, the theme or other type of the game 414*g* may be used for selecting the fulfillment site. For example, if the player is playing on an Elvis-theme game (e.g. as described in U.S. patent application Ser. No. 09/166, 483 incorporated herein by reference), a prize fulfillment site which offers Elvis music and/or memorabilia may be used. If a prize is won on a race car—theme gaming terminal, a prize fulfillment site offering NASCAR memorabilia may be selected.

Once it has been determined which entity will act as the fulfillment entity 412 (or if there is only a single fulfillment entity) the fulfillment entity will preferably be provided with information which can be used in connection with the fulfillment process 416. In one embodiment, the fulfillment entity will be provided with information regarding the size or type of prize 418*a*. Preferably, the fulfillment entity has prearranged, with the casino 110, which types of prizes or values of prizes will be awarded in response to various types of wins. In this fashion, the casino may communicate only, for example, the type or value of the prize (or a code associated therewith) and the fulfillment entity will retrieve or formulate an appropriate prize or prize selection, corresponding to the value of the prize won. In one embodiment, the fulfillment entity will receive information regarding previous wins or prizes 418*b*. In this way the fulfillment entity can enhance variety by avoiding offering, as a prize, an item which has already been won by the player. In one embodiment, the entity receives information about a player or player characteristics such as preferences, interests, etc. 418*c* so that the entity may select an item which is likely to be of interest to a player. For example, the fulfillment entity may have information (provided by the user or provided as a result of previous user selections or winnings and the like) indicating that user or player has a preference for a particular genre of book or music and the fulfillment entity may offer a prize or a selection of prizes corresponding to such user interest. Other user information can be employed in other fashions. For example, user identity may be used for personalizing the display. User account information can be used for authorizing upgrades or prize changes and the like.

In one embodiment, delivery information either input by the user (as described in FIG. 3) or obtained from a player card or stored information as described above is sent the fulfillment site.

In the embodiment of FIG. 4, the central computer 116 transmits information to a casino financial account 156 (such as a casino bank account) authorizing debiting the account for the prize amount (which may include not only the value of the goods or services delivered but also the cost of delivery, fee charged by the fulfillment entity and the like.) Preferably, the charge authorization is accompanied by an identification number or code, e.g. for accounting and/or security purposes. The fulfillment and/or remote site 424 selects or formulates a web page or similar display information showing a prize or prize choices for display to the user 424. In one embodiment, one or more of the prize fulfillment entities is also an entity which is a Internet (or other) retail establishment and preferably the web page provided to the gaming terminal player is different from a web page ordinarily accessed by retail consumers. In embodiments in which the players are provided with several prizes to select among, the player chooses the desired prize 426 and/or indicates options (such as color, size, flavor and the like), e.g. using input devices 136, 138. The remote site then arranges 428 for delivery to the player, e.g. as described above. The remote site 432 sends a request for transfer of funds from the casino's bank account 156. Preferably, the request is accompanied by a transaction identifier. The casino financial institution 156 will attempt to match the request and/or identifier 432 with the authorization 422 received from the casino and, if there is an appropriate match, funds will be appropriately transferred. Although the embodiment of FIG. 4 illustrates a system in which fund transfers are performed on a win-by-win or prize-by-prize basis, it is also possible to perform accounting or balancing between the casino and the fulfillment entity by accumulating numerous prize transactions and performing accounting in a batch process (e.g. hourly, daily and the like).

In light of the above description, a number of advantages of the present invention can be seen. The present invention facilitates electronic fulfillment of prizes, especially non-monetary prizes and reduces or eliminates the burden on casinos associated with prize fulfillment such as the cost of maintaining inventory, the cost of delivery goods or services, the cost of certain account or tracking processes and the like. The present invention facilitates the provision of a relatively wide variety of non-monetary prizes, e.g. so as to assist in maintaining longevity and consistency of player interest.

A number of variations and modifications of the invention can be used. It is possible to use some aspects of the invention without using others. For example, it is possible to provide for electronic fulfillment of non-monetary prizes without using third party entities (separate from a casino or other gaming operator) to achieve such fulfillment. It is possible to use third party entities for fulfillment of non-monetary prizes without storing player identification or address information on a player card or similar token. Although the invention has been illustrated by way of certain embodiments illustrated in various figures, it is possible to provide embodiments which combine various features or elements or steps drawn from different ones of the figures. It is possible to provide embodiments which have more or fewer steps or elements than those depicted in the figures. It is possible to provide embodiments which perform steps in an order different from that depicted or described. Although it is possible to provide configurations in which a given prize is always fulfilled by the same fulfillment center, in one embodiment, prizes of a given gaming terminal can be fulfilled by any of a variety of different prize fulfillment entities (such as different Internet retail companies). In this situation, the selection among the various potential prize fulfillment entities can be made on any or all of a number of different basis such as randomly, based on the cost or charge currently being made for the prize fulfillment, based on the type of game and/or type of prize which has been won, and/or based on information about the player such as information which has been stored previously, regarding the player and/or information which the player provides such as indicating player preferences. Although the present invention has been described in the context of a casino in which gaming terminals 112 are coupled to prize fulfillment sites via a central computer 116, it is also possible to provide coupling of individual gaming terminals 112 directly to the Internet or other communication system for communicating with prize fulfillment entities and/or to provide for non-casino-based gaming devices such as games running on personal computers 128 coupled by the Internet 132 to prize fulfillment sites.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A gaming terminal apparatus comprising:

a wager acceptor; and a display for displaying at least a first web page from at least one of a multiple of remote fulfillment sites in response to at least a first game outcome, wherein said multiple web pages may be navigated and a prize is displayed in response to communication sent to said remote fulfillment site from a central computer linked to a first gaming terminal, over a communications link, wherein a remote site provides communications for accounting information to be sent to the central computer and for controlling a prize display at a second gaming terminal, different from said first gaming terminal.

2. A gaming terminal, as claimed in claim 1, wherein said display also displays at least a second non-monetary prize and wherein said gaming terminal further comprises at least a first player input device for selecting between at least said first and second prizes.

3. A gaming terminal, as claimed in claim 1, wherein said communications link is selected from among a telephone link and an Internet link.

4. A gaming terminal, as claimed in claim 1, wherein said display of said first non-monetary prize includes a pictorial or graphic prize display.

5. A gaming terminal, as claimed in claim 1, wherein said central computer authorizes release of funds from the casino financial account to said first remote site which outputs instructions for delivering a prize to a location different from the location of said gaming terminal.

6. An apparatus, as claimed in claim 5, wherein said location is a home address of a player of said gaming terminal.

7. A gaming terminal, as claimed in claim 1, wherein said display for displaying at least a first non-monetary prize displays a first display for a first player in response to a first gaming outcome and wherein said gaming terminal displays a second display, different from said first display, in response to said first gaming outcome, to a second player, different from said first player.

8. A gaming terminal, as claimed in claim 1, further comprising means for obtaining information indicative of a stored player preference for transmission to said remote site and said remote site also performing accounting and data capture processes for multiple gaming terminal game outcomes.

9. An apparatus, as claimed in claim 8, wherein said player preference information is obtained using information stored on a token.

10. An apparatus, as claimed in claim 9, wherein said token comprises an encoded card.

11. A gaming terminal apparatus for use by a player comprising:

a wager acceptor and a central computer located at a host establishment;

a display for displaying at least a first non-monetary prize from at least one of a multiple of prize fulfillment web sites;

a reader for a token permitting obtaining first information; and a display controller for controlling said display and providing for navigation of said prize fulfillment web site in order to present at least a first prize in response to a first gaming outcome for a first player, selected using said first information and receiving instructions from said host establishment central computer wherein said display is different from a display presented to a second player in response to said first gaming outcome.

12. A method for prize fulfillment in a gaming system comprising:

providing a plurality of gaming terminals;

transmitting an electronic message to a central computer that transmits a corresponding electronic message to at least one of a plurality of remote prize fulfillment web sites in response to at least a first gaming outcome at a first of said plurality of gaming terminals;

navigating said remote prize fulfillment site to choose a prize;

wherein said electronic message includes information indicative of at least one;

a prize type; and a delivery location.

13. A method, as claimed in claim 12, further comprising selecting said remote site from among a plurality of remote sites.

14. A method, as claimed in claim 12, further comprising transmitting a plurality of prize options for display at said first gaming terminal.

15. A method, as claimed in claim 14, further comprising receiving, at said first gaming terminal, input from said player indicating a selection from among said plurality of prize options.

16. A method, as claimed in claim 12, wherein said plurality of prize options is transmitted according to an Internet protocol to said remote site and the central computer so that the central computer can authorize payment to the remote site for the prize.

17. Apparatus for prize fulfillment in a gaming system comprising:

a pluralin of gaming terminals;

means, in said plurality of gaming terminals, for transmitting an electronic message, over the Internet, to at least one of a plurality of remote sites, in response to at least a first gaming outcome, wherein said message includes information indicative of at least one of a prize type and a delivery location;

a central computer linked to the gaming terminals and also receiving said message and authorizing said remote site to deliver said prize and displaying a web page from said remote site in order to allow a player to navigate the site and select a prize; and means, in said remote site, for automatically outputting instructions for delivering a non-monetary prize, in response to said electronic message.

18. A method for prize fulfillment in a gaming system, comprising the steps of:

providing a gaming terminal with a display device connected to a central computer;

determining if a selected gaming outcome has occurred at said gaming terminal;

if said selected outcome has occurred then linking to the central computer and over the Internet to at least one of a plurality of remote fulfillment web sites; and displaying one or more web pages from said fulfillment web sites on the display device of said gaming terminal and allowing navigation of said fulfillment web site in order to choose a prize.

19. A method as defined in claim 18, in which said selected gaming outcome entitles the player to a nonmonetary prize intended for electronic fulfillment.

20. A method as defined in claim 18, in which one of said web pages displayed on the display device presents choices of prizes to the player.

21. A method as defined in claim 19, including the step of enabling a player to upgrade the prize the player has won.

22. A method for prize fulfillment in a gaming system, comprising the steps of:

providing a gaming terminal with a display device and the gaming terminal connected to a central computer;

determining if a prize has been won by a player;

if a prize has been won, then determining if the prize is intended for electronic fulfillment;

if a prize is not intended for electronic fulfillment, then awarding a monetary payout;

if the prize is intended for electronic fulfillment then providing a player selected option to choose from electronic fulfillment via a gaming terminal or linking to at least one of a plurality of remote fulfillment web sites;

navigating said remote fulfillment web site;

choosing a prize from said remote fulfillment web site;

providing authorization to the remote fulfillment site from the central computer; and arranging for delivering the prize from a remote location to a delivery site.

23. A method as defined in claim 22, in which the remote site is an Internet web site.

24. A method as defined in claim 22, including the steps of inputting delivery information and transmitting said delivery and accounting information to the remote site.

25. A method for prize fulfillment in the gaming system, comprising with steps of:

providing a gaming terminal with a display device;

determining if a prize intended for electronic fulfillment has been won;

if a prize for electronic fulfillment has been won, then establishing connection from said gaming terminal to at least one of a plurality of remote fulfillment web sites;

inputting delivery information on the remote fulfillment web site and navigating the remote fulfillment web site at said gaming terminal;

selecting a prize from the remote fulfillment web site at said gaming terminal;

transmitting to the remote fulfillment web site authorization from a central computer; and arranging at said remote fulfillment web site for delivery of the prize to a delivery site.

26. A method for prize fulfillment in a gaming system, comprising the steps of:

providing a gaming terminal with a display device;

determining if a selective gaming outcome has occurred at said gaming terminal;

if said selected outcome has occurred, then linking over the Internet to at least one of a plurality of remote fulfillment web sites;

displaying a web page from said remote fulfillment web sites on said display device;

navigating the web page;

selecting a prize at said gaming terminal from said web page;

transmitting information concerning said prize selection to said remote fulfillment site and a host establishment central computer;

arranging for delivery of the prize to a player's delivery site; and the fulfillment site linked to a financial account site providing accounting for multiple prize deliveries and reporting such information to the host establishment central computer.

27. A gaming system for a casino comprising:

a first group of gaming terminals;

a central computer within a casino coupled to the group of gaming terminals;

at least one of a plurality of remote prize fulfillment web sites outside of the casino in communication with the central computer;

a casino financial account site in communication with the central computer and the remote prize fulfillment web site;

a first gaming outcome provided by the gaming terminals transmitted to the central computer and prompting the central computer to transmit a gaming outcome to the casino financial account site which provides an authorization instruction to the remote prize fulfillment web site; and a link provided by each of said gaming terminals providing for player navigation of the remote prize fulfillment web site and allowing player selection of a prize and the casino financial account site prompting the remote prize fulfillment web site to deliver a prize to a preselected address provided by the gaming terminals.

28. The casino gaming system of claim 27 wherein the remote prize fulfillment site provides an accounting report to the central computer identifying all prizes distributed and the corresponding gaming outcome instruction in a batch process.

29. The casino gaming system of claim 27 wherein the remote prize fulfillment site provides an accounting report to the casino financial account site identifying all prizes distributed and the corresponding gaming outcome instruction in a batch process.

30. The casino gaming system of claim 27 wherein the central computer is a cluster controller linked to the first cluster of gaming terminals.

31. The casino gaming system of claim 27 wherein the casino financial account site performs accounting and balancing between the casino and the prize fulfillment site in a batch process.

32. The casino gaming system of claim 27 wherein the central computer is linked to a second cluster of gaming terminals.

33. The casino gaming system of claim 27 wherein the central computer is linked to multiple clusters of gaming terminals.

34. The gaming system of claim 27 wherein the link provided by each of said gaming terminals is an Internet link.

35. The gaming system of claim 27 wherein the link provided by each of said gaming terminals is an Internet link.

36. The gaming system of claim 27 wherein the remote prize fulfillment site transmits a web page for display by the gaming terminal displaying a plurality of prize options and allowing the player to choose and select the prize options.

* * * * *